United States Patent
Cheng

(10) Patent No.: US 9,274,620 B2
(45) Date of Patent: Mar. 1, 2016

(54) OPERATING SYSTEM WITH SHORTCUT TOUCH PANEL HAVING SHORTCUT FUNCTION

(71) Applicant: Wei-Chih Cheng, Taoyuan County (TW)

(72) Inventor: Wei-Chih Cheng, Taoyuan County (TW)

(*) Notice: Subject to any disclaimer, the term of this patent is extended or adjusted under 35 U.S.C. 154(b) by 156 days.

(21) Appl. No.: 14/248,816

(22) Filed: Apr. 9, 2014

(65) Prior Publication Data

US 2015/0293616 A1    Oct. 15, 2015

(51) Int. Cl.
*G06F 3/0354* (2013.01)
*G06F 3/041* (2006.01)

(52) U.S. Cl.
CPC .......... *G06F 3/03547* (2013.01); *G06F 3/0412* (2013.01); *G06F 2203/04106* (2013.01)

(58) Field of Classification Search
CPC ............ G06F 3/04883; G06F 3/04842; G06F 3/04845; G06F 3/04886; G06F 2203/04803; G06F 2203/04808; G06F 2200/1636; G06F 3/03547; G06F 3/0412; G06F 2203/04106
See application file for complete search history.

(56) References Cited

U.S. PATENT DOCUMENTS

| | | | |
|---|---|---|---|
| 5,943,044 A * | 8/1999 | Martinelli | G06F 3/03547 178/18.01 |
| 6,346,935 B1 * | 2/2002 | Nakajima | G06F 1/1616 345/173 |
| 6,424,338 B1 * | 7/2002 | Anderson | G06F 3/0213 178/18.01 |
| 7,730,401 B2 * | 6/2010 | Gillespie | G06F 3/0488 345/156 |
| 8,259,077 B2 * | 9/2012 | Shin | G06F 3/03547 178/18.01 |
| 8,446,370 B2 * | 5/2013 | Zadesky | G06F 1/1626 345/156 |
| 8,866,750 B2 * | 10/2014 | Bentsen | G06F 3/03547 345/173 |
| 9,172,897 B2 * | 10/2015 | Carvajal | H04N 5/4403 |
| 2005/0012723 A1 * | 1/2005 | Pallakoff | G06F 1/1616 345/173 |
| 2006/0022960 A1 * | 2/2006 | Fukushima | G06F 3/03547 345/173 |
| 2006/0028454 A1 * | 2/2006 | Branton | G06F 3/03547 345/173 |
| 2006/0109259 A1 * | 5/2006 | Ohta | G06F 3/0485 345/173 |
| 2006/0187216 A1 * | 8/2006 | Trent, Jr. | G06F 3/03547 345/173 |
| 2007/0057922 A1 * | 3/2007 | Schultz | G06F 3/03547 345/173 |
| 2010/0188268 A1 * | 7/2010 | Grignani | G06F 3/0485 341/22 |
| 2011/0013010 A1 * | 1/2011 | Shirota | G02B 21/365 348/79 |
| 2011/0109560 A1 * | 5/2011 | Carvajal | G06F 3/03547 345/173 |
| 2011/0109586 A1 * | 5/2011 | Rip | G06F 3/03547 345/174 |

(Continued)

*Primary Examiner* — Lun-Yi Lao
*Assistant Examiner* — Elliott Deaderick
(74) *Attorney, Agent, or Firm* — WPAT, P.C.; Anthony King

(57) ABSTRACT

An operating system having a shortcut touch panel having shortcut functions, wherein the operating system has an electronic device and a shortcut touch panel. The electronic device has a display screen having multiple display areas. The shortcut touch panel has a first function mode and a second function mode, wherein the shortcut touch panel has a shortcut ring. The shortcut ring has multiple ring sensing sections. When the shortcut touch panel is operated in the first function mode, a screen cursor on the display screen can be moved to any display area rapidly by the shortcut touch panel. When the shortcut touch panel is operated in the second function mode, the shortcut touch panel can launch custom functions of the electronic device rapidly.

22 Claims, 19 Drawing Sheets

(56) References Cited

U.S. PATENT DOCUMENTS

| | | | |
|---|---|---|---|
| 2011/0113368 A1* | 5/2011 | Carvajal | G06F 3/03547 715/810 |
| 2011/0113371 A1* | 5/2011 | Parker | G06F 1/3215 715/810 |
| 2011/0113374 A1* | 5/2011 | Sheehan | G06F 3/03547 715/825 |
| 2011/0113380 A1* | 5/2011 | Sakalowsky | G06F 3/0482 715/841 |
| 2011/0141045 A1* | 6/2011 | Choi | G06F 1/1626 345/173 |
| 2011/0291956 A1* | 12/2011 | Mann | G06F 1/1626 345/173 |
| 2011/0292268 A1* | 12/2011 | Mann | B62D 1/046 348/333.01 |
| 2012/0081294 A1* | 4/2012 | Dinh | G06F 3/03547 345/169 |
| 2013/0041243 A1* | 2/2013 | Byrd | G06T 19/003 600/374 |
| 2013/0229373 A1* | 9/2013 | Eriksson | G06F 1/1616 345/173 |
| 2014/0168118 A1* | 6/2014 | Wang | G06F 3/044 345/173 |

* cited by examiner

OPERATING SYSTEM WITH SHORTCUT TOUCH PANEL HAVING SHORTCUT FUNCTION

BACKGROUND OF THE INVENTION

1. Field of the Invention

The present invention relates to an operating system and more particularly to an operating system having a shortcut touch panel having shortcut functions.

2. Description of Related Art

Generally, with reference to FIG. 11, a conventional operating system of a laptop 60 usually comprises a touch panel 70 as an input device for a user to operate the laptop 60, and the touch panel 70 is used similarly to a mouse of a desktop for user moving a screen cursor 81 displayed on a monitor 80 of the laptop 60. When an object such as a finger slides on the touch panel 70, the screen cursor 81 moves on the monitor 80 along a sliding direction of the finger, wherein a moving distance d1 of the screen cursor 81 on the monitor 80 is proportional to a moving distance d2 of the finger on the touch panel 70.

However, most touch panels of laptops do not have wide surfaces for sliding due to limited sizes of the laptops. Therefore, when a user has to move a screen cursor on a monitor for a long distance, a slide distance on a touch panel may exceed an edge of the touch panel, that is, the user has to slide multiple times on the touch panel to make a moving distance of the screen cursor on the monitor reach the long distance as desired.

Furthermore, when a user has to adjust volume, brightness of a laptop, or turn off the laptop, the user has to move the screen cursor 81 on the monitor of the laptop to click icons corresponding to the above functions in a user interference (UI) displayed on the monitor by sliding on the touch panel.

In conclusion, the touch panel of the conventional operating system of the laptop is not convenient in the above two situations. Besides, conventional operating system of a laptop mostly only has a touch panel mounted on a right side of the laptop for right-handed users, and is not convenient for left-handed users or users accustomed to using two touch panels at one time.

SUMMARY OF THE INVENTION

The main objective of the invention is to provide an operating system having a shortcut touch panel having shortcut functions for moving a screen cursor and launching system functions rapidly.

The operating system has an electronic device and a shortcut touch panel. The electronic device has a monitor unit mounted on the electronic device and having a display screen, wherein the display screen is divided into multiple display areas and has a screen cursor displayed on the display screen. The shortcut touch panel is electrically connected to the electronic device, and has a touch screen, a shortcut ring surrounding the touch screen, and a function switch, wherein the shortcut touch panel has a first function mode and a second function mode. The function switch is used to switch the function mode of the shortcut ring. When the shortcut touch panel senses an object moving on the touch screen, the screen cursor moves along a moving direction of the object on the display screen, and a moving distance of the screen cursor is proportional to a moving distance of the object. The shortcut ring has multiple sensing ring sections. When the shortcut touch panel is operated in the first function mode, the multiple sensing ring sections respectively correspond to the multiple display areas of the display screen of the monitor unit. When the shortcut touch panel senses a control action on any sensing ring section, the screen cursor is displayed on one of the display areas corresponding to the sensing ring section that has the control action sensed thereon. When the shortcut touch panel is operated in the second function mode, the multiple sensing ring sections each have a respective custom function corresponding to the electronic device. When the shortcut touch panel senses a control action on any sensing ring section, the custom function corresponding to the sensing ring section that has the control action sensed thereon is launched.

Another operating system in accordance with the present invention has an electronic device, a touch panel, and a shortcut touch panel. The electronic device has a monitor unit mounted on the electronic device and having a display screen, wherein the display screen is divided into multiple display areas and has a screen cursor displayed on the display screen. The touch panel is electrically connected to the electronic device, and has a touch screen, wherein when the touch panel senses an object moving on the touch screen, the screen cursor moves along a moving direction of the object on the display screen, and a moving distance of the screen cursor is proportional to a moving distance of the object. The shortcut touch panel is electrically connected to the electronic device, and has a shortcut screen and a function switch, wherein the shortcut touch panel has a first function mode and a second function mode, and the function switch is used to switch the function mode of the shortcut touch panel. The shortcut screen is divided into multiple sensing sections. When the shortcut touch panel is operated in the first function mode, the multiple sensing sections respectively correspond to the multiple display areas of the display screen of the monitor unit. When the shortcut touch panel senses a control action on any sensing section, the screen cursor is displayed on one of the display areas corresponding to the sensing section that has the control action sensed thereon. When the shortcut touch panel is operated in the second function mode, the multiple sensing sections each have a respective custom function corresponding to the electronic device. When the shortcut touch panel senses a control action on any sensing section, the custom function corresponding to the sensing section that has the control action sensed thereon is launched.

When the shortcut ring of the shortcut touch panels of the above two operating systems in accordance with the present invention are operated in the first function mode, a user can make the screen cursor displayed on a display area of the display screen closest to an expected position on the display screen by doing the control action on the multiple sensing ring sections of the shortcut ring or the multiple sensing sections of the shortcut screen, and then the user is able to move the screen cursor to the expected position by only one slide on the touch screen of the shortcut touch panel or the touch panel.

When the shortcut ring of the shortcut touch panel or the shortcut touch panel of the above two operating systems in accordance with the present invention are operated in the second function mode, a user can rapidly launch various functions of the electronic device by doing the control action on the multiple sensing ring sections of the shortcut ring or the multiple sensing sections of the shortcut screen.

Another objective of the invention is to provide an operating system having two unfixed touch panels for a user to change positions of the two touch panels as desired.

The operating system has an electronic device, a touch panel and a shortcut touch panel. The electronic device has a monitor unit mounted on the electronic device and having a display screen, wherein the display screen is divided into multiple display areas and has a screen cursor displayed on the display screen. The touch panel is electrically connected to the electronic device, has a touch screen and a first wireless transmission module, wherein when the touch panel senses an object moving on the touch screen, the screen cursor moves along a moving direction of the object on the display screen, and a moving distance of the screen cursor is proportional to a moving distance of the object. The touch panel is wirelessly connected to the electronic device by the first wireless transmission module. The shortcut touch panel is electrically connected to the electronic device, and has a shortcut screen, a function switch, and a second wireless transmission module, wherein the shortcut touch panel has a first function mode and a second function mode. The shortcut screen is divided into multiple sensing sections. The shortcut touch panel is wirelessly connected to the electronic device by the second wireless transmission module. When the shortcut touch panel is operated in the first function mode, the multiple sensing sections respectively correspond to the multiple display areas of the display screen of the monitor unit. When the shortcut touch panel senses a control action on any sensing section, the screen cursor is displayed on one of the display areas corresponding to the sensing section that has the control action sensed thereon. When the shortcut touch panel is operated in the second function mode, the multiple sensing sections each have a respective custom function corresponding to the electronic device. When the shortcut touch panel senses a control action on any sensing section, the custom function corresponding to the sensing section that has the control action sensed thereon is launched.

By the first wireless transmission module and the second wireless transmission module, the touch panel and the shortcut touch panel are both wirelessly connected to the electronic device, thus, a user can change positions of the touch panel and the shortcut touch panel as desired regardless that the user is right-handed, left-handed or using two hands.

DETAILED DESCRIPTION OF THE PREFERRED EMBODIMENTS

Figure 1:
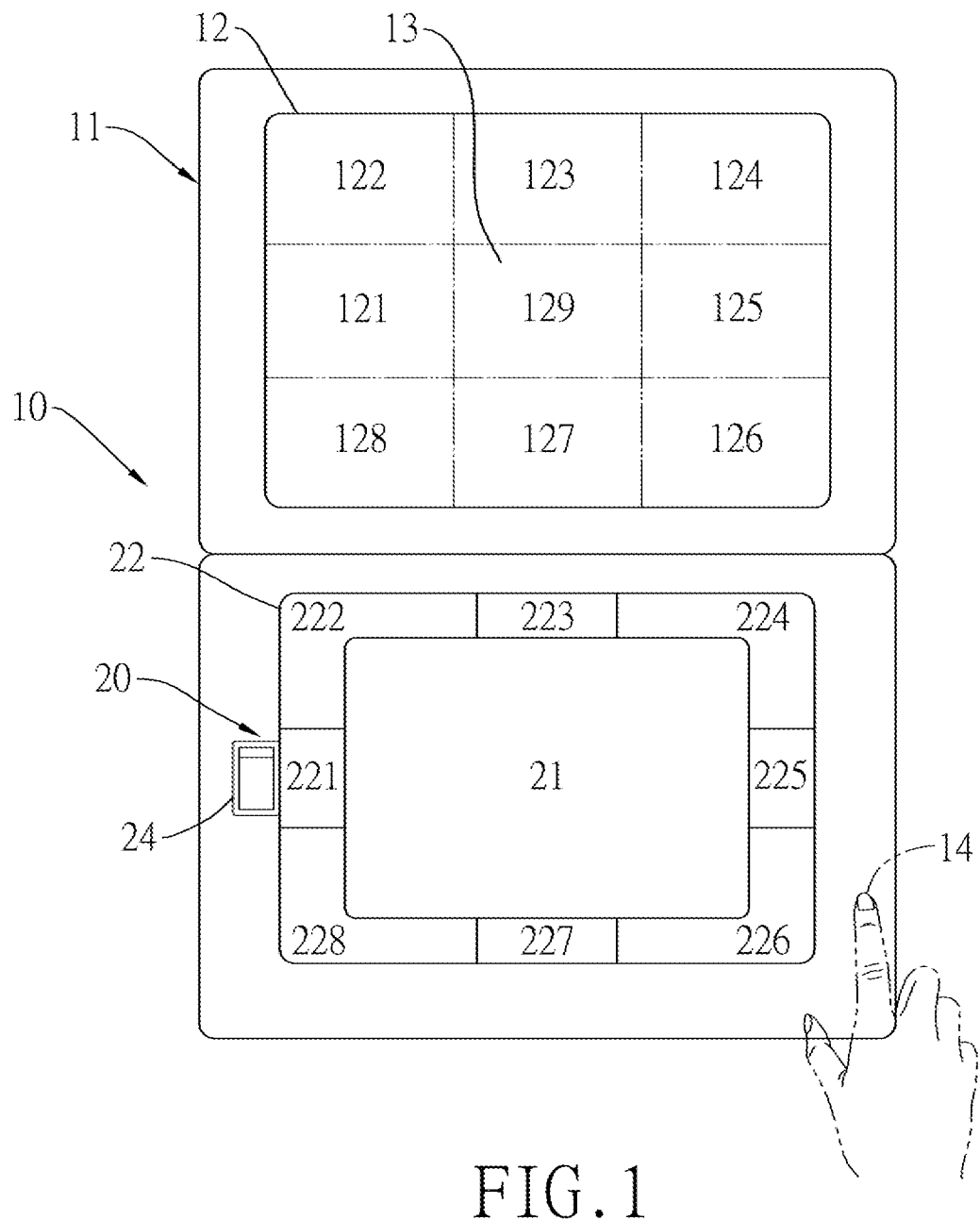
FIG. 1 is a top view of a first preferred embodiment of an operating system in accordance with the present invention.

With reference to FIG. 1, a first preferred embodiment of an operating system in accordance with the present invention comprises an electronic device 10 and a shortcut touch panel 20 electrically connected to the electronic device 10. In this first preferred embodiment, the electronic device 10 is a laptop.

The electronic device 10 has a monitor unit 11. The monitor unit 11 has a display screen 12, wherein the display screen 12 is square and is divided into a three-by-three grid having nine blocks, wherein the nine blocks are respectively a first display area 121 to a ninth display area 129 in sequence. A screen cursor 13 is displayed on the display screen 12.

The ninth display area 129 is located at a center of the display screen 12. The second display area 122, the fourth display area 124, the sixth display area 126 and the eighth display area 128 are respectively located at an upper left corner, an upper right corner, a lower right corner, and a lower left corner of the display screen 12.

The first display area 121 is located between the second display area 122 and the eighth display area 128. The third display area 123 is located between the second display area 122 and the fourth display area 124. The fifth display area 125 is located between the fourth display area 124 and the sixth display area 126. The seventh display area 127 is located between the sixth display area 126 and the eighth display area 128. The first display area 121, the third display area 123, the fifth display area 125, and the seventh display area 127 are respectively adjacent four sides of the ninth display area 129. The first display area 121 to the eighth display area 128 are adjacent a periphery of the display screen 12.

The shortcut touch panel 20 is electrically connected to the electronic device 10, and has a touch screen 21, a shortcut ring 22 and a function switch 24, wherein the shortcut touch panel 20 has a first function mode and a second function mode. The function switch 24 is used to switch the function mode of the shortcut touch panel 20. In this first preferred embodiment, the function switch 24 is a button or a toggle switch.

Figure 2:
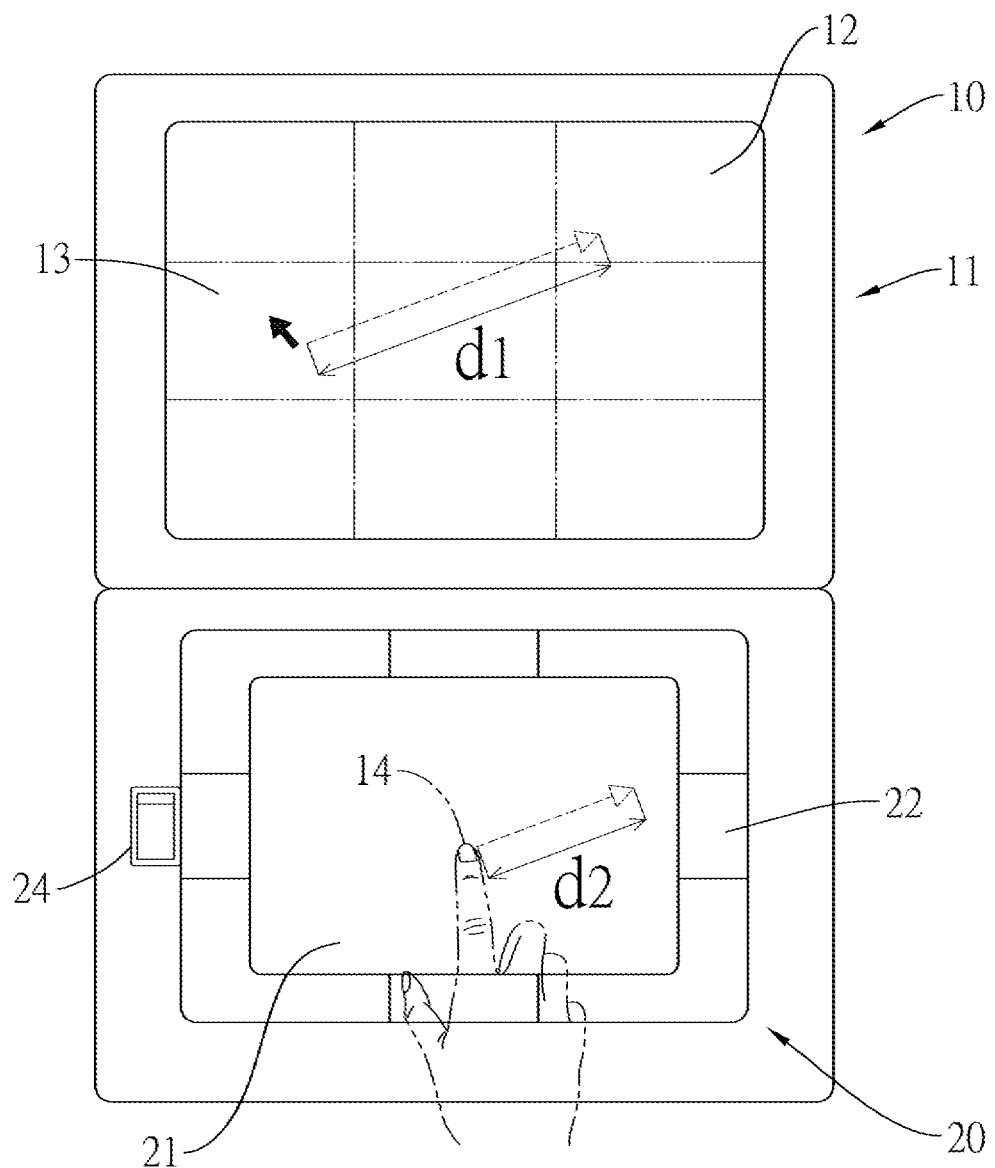
FIG. 2 shows a touch screen of a shortcut touch panel of the operating system in FIG. 1.

With reference to FIG. 2, when the shortcut touch panel 20 senses an object 14 moving on the touch screen 21, the screen cursor 13 moves along a moving direction of the object 14 on the touch screen 21, and a moving distance d2 of the screen cursor 13 is proportional to a moving distance d1 of the object 14. In this first preferred embodiment, the object 14 is a finger of a user or a stylus.

Figure 3A:
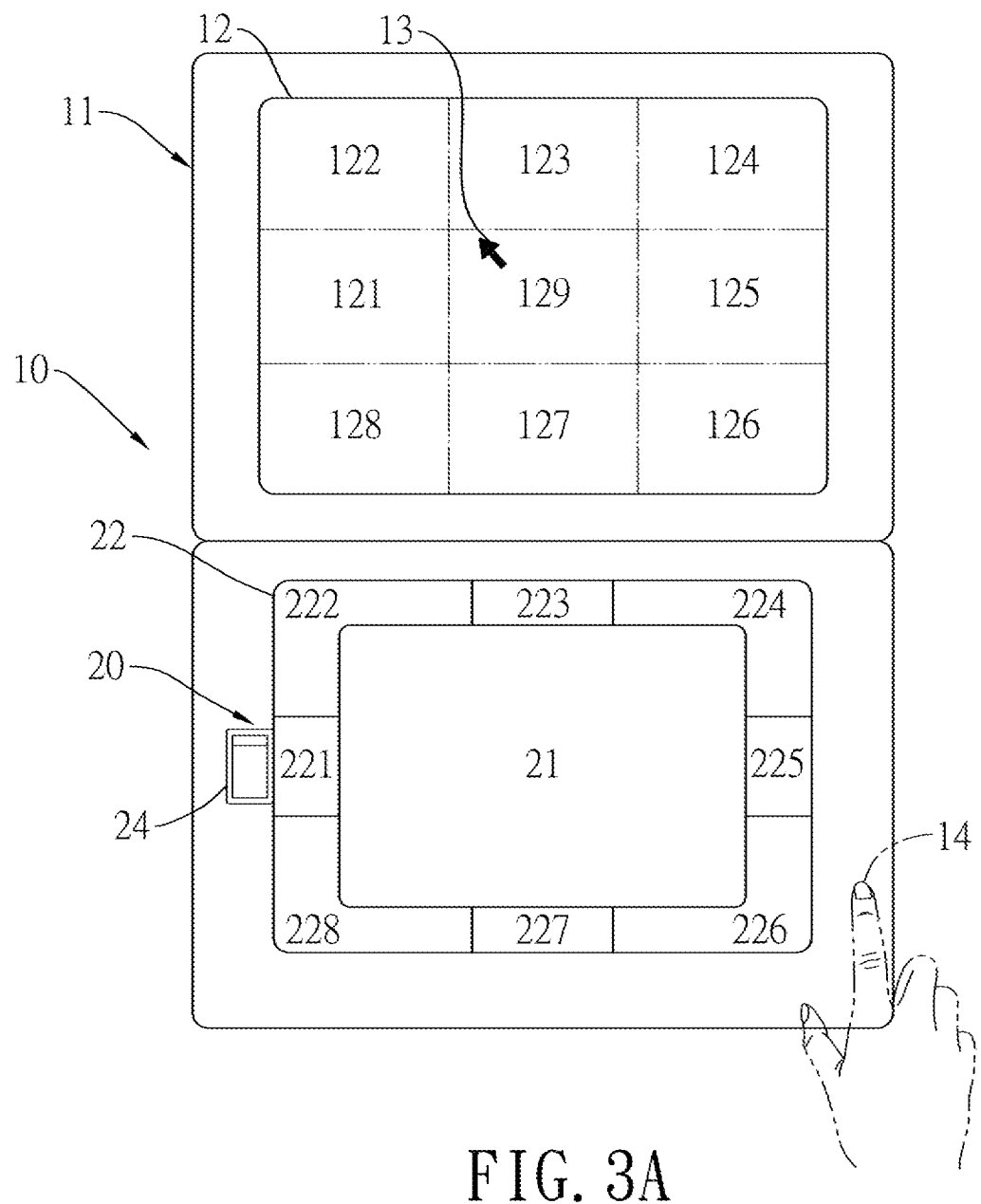
FIGS. 3A to 3C show operating a shortcut ring of the shortcut touch panel of the operating system in FIG. 1.
Figure 3B:
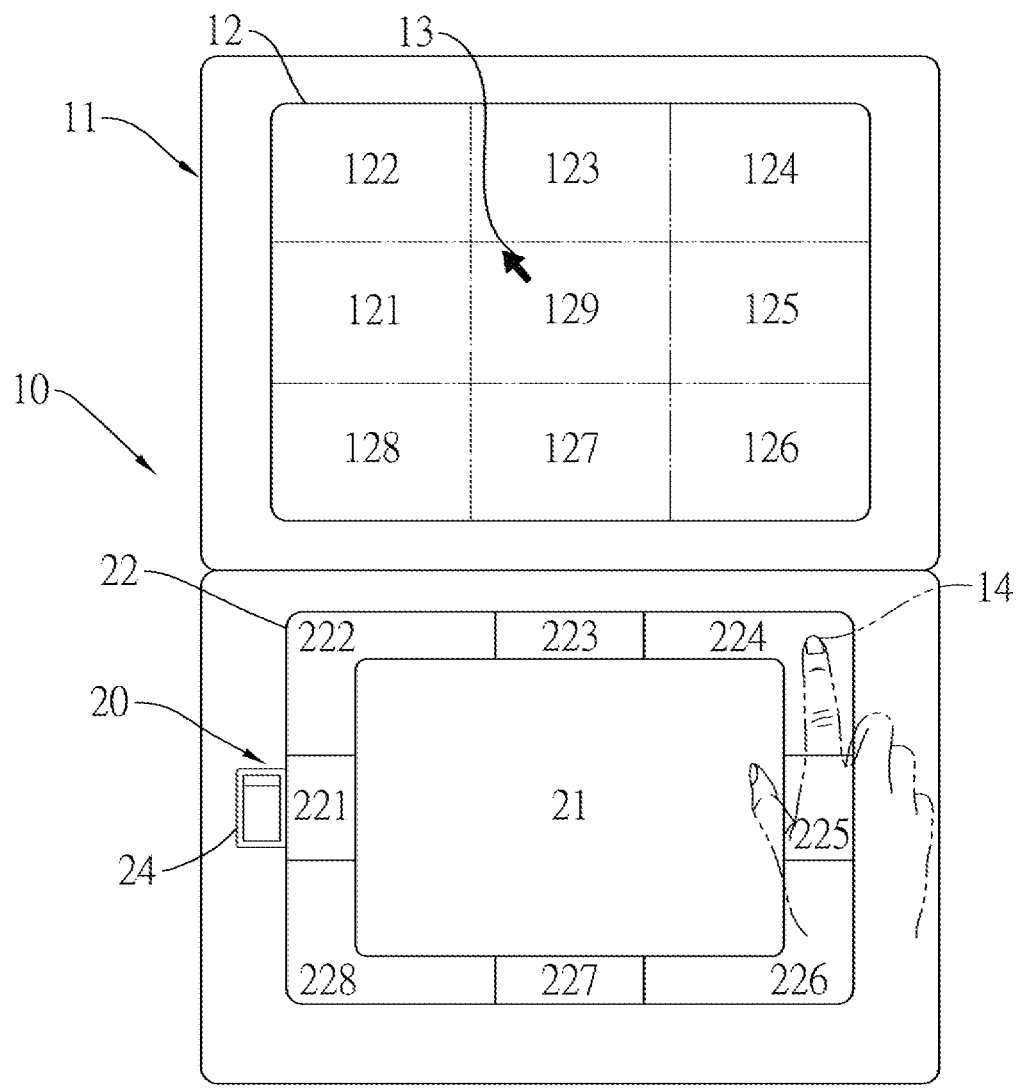
Figure 3C:
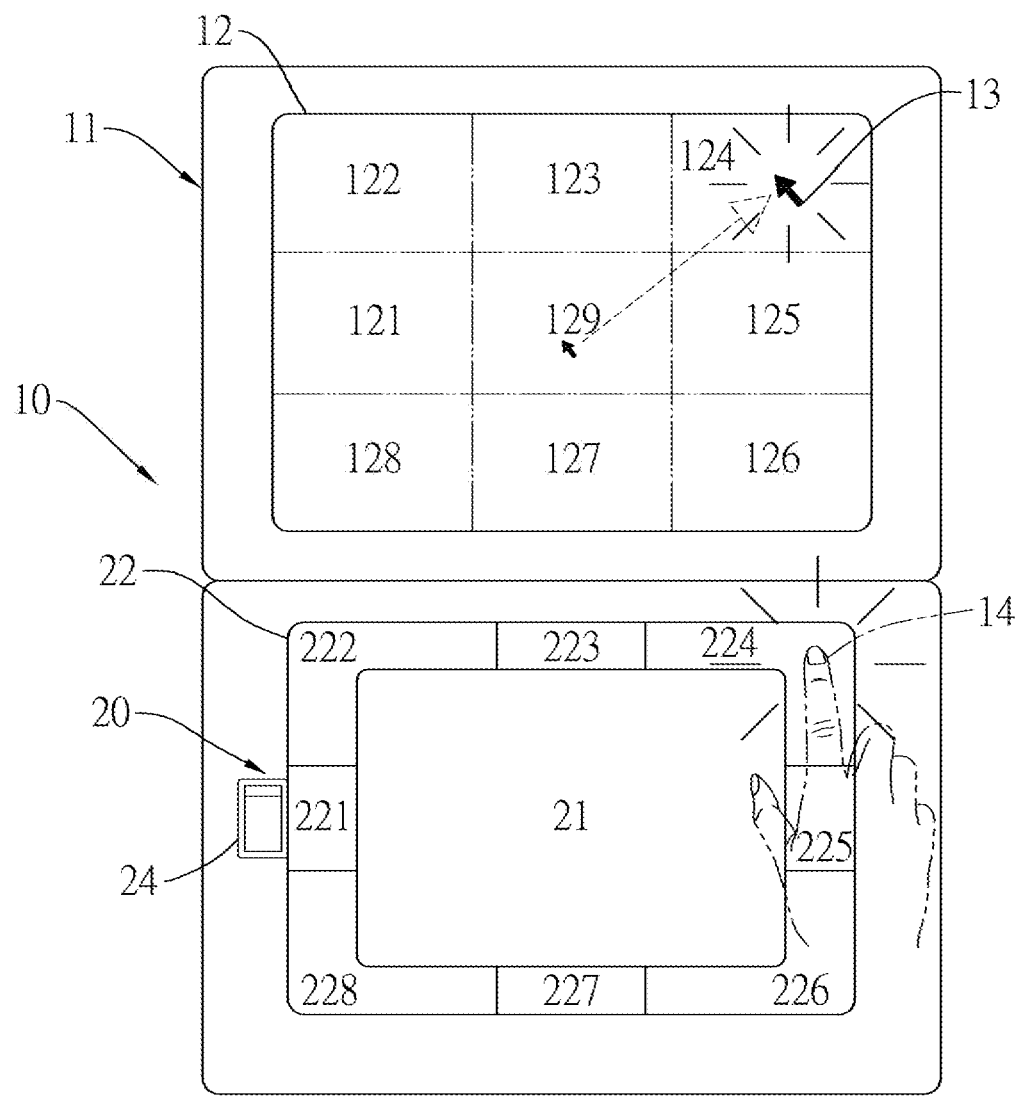

With reference to FIGS. 3A to 3C, the shortcut ring 22 surrounds the touch screen 21, wherein the shortcut ring 22 is composed of eight sensing ring sections 221 to 228 connected in series, which are respectively a first sensing ring section to an eight sensing ring section in sequence. The second sensing ring section 222, the fourth sensing ring section 224, the sixth sensing ring section 226, and the eighth sensing ring section 228 are all curved, and respectively adjacent an upper left corner, an upper right corner, a lower right corner and a lower left corner of a periphery of the touch screen 21. The first sensing ring section 221 is straight and is connected in series between the second sensing ring section 222 and the eighth sensing ring section 228. The third sensing ring section 223 is straight and is connected in series between the second sensing ring section 222 and the fourth sensing ring section 224. The fifth sensing ring section 225 is straight and is connected in series between the fourth sensing ring section 224 and the sixth sensing ring section 226. The seventh sensing ring section 227 is straight and is connected in series between the sixth sensing ring section 226 and the eighth sensing ring section 228.

When the shortcut touch panel 20 is operated in the first function mode, the first sensing ring section 221 to the eighth sensing ring section 228 of the shortcut ring 22 sequentially correspond to the first display area 121 to the eighth display area 128 of the display screen 12 respectively. When the shortcut touch panel 20 senses a control action on any sensing ring sections 221 to 228, the screen cursor 13 is displayed on one of the display areas 121 to 128 corresponding to the sensing ring section 221 to 228 that has the control action sensed thereon. In this first preferred embodiment, the control action is a double click or a pressing for at least one second on any sensing ring section 221 to 228.

Figure 4A:
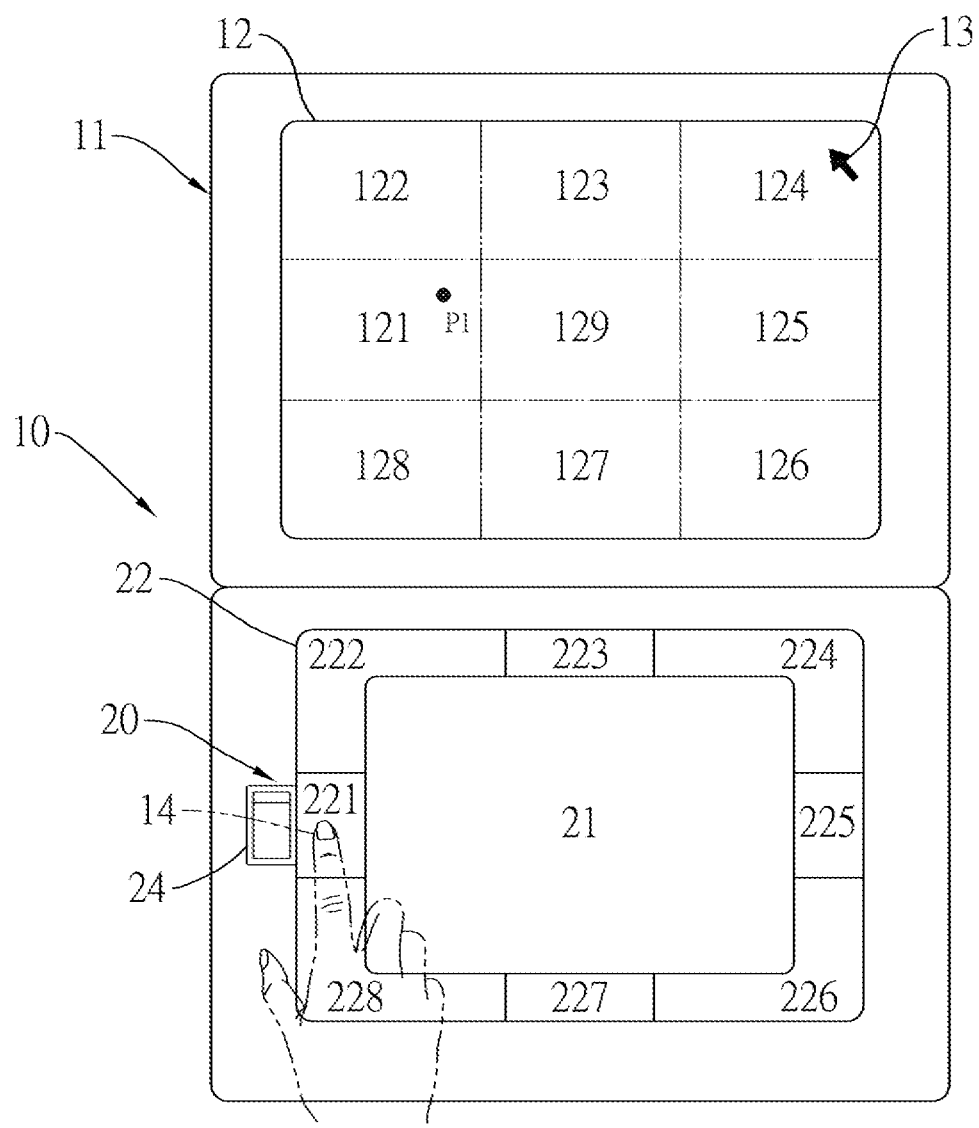
FIG. 4A to 4C show moving a screen cursor to an expected position on a display screen of the operating system in FIG. 1 by operating the shortcut touch panel.
Figure 4B:
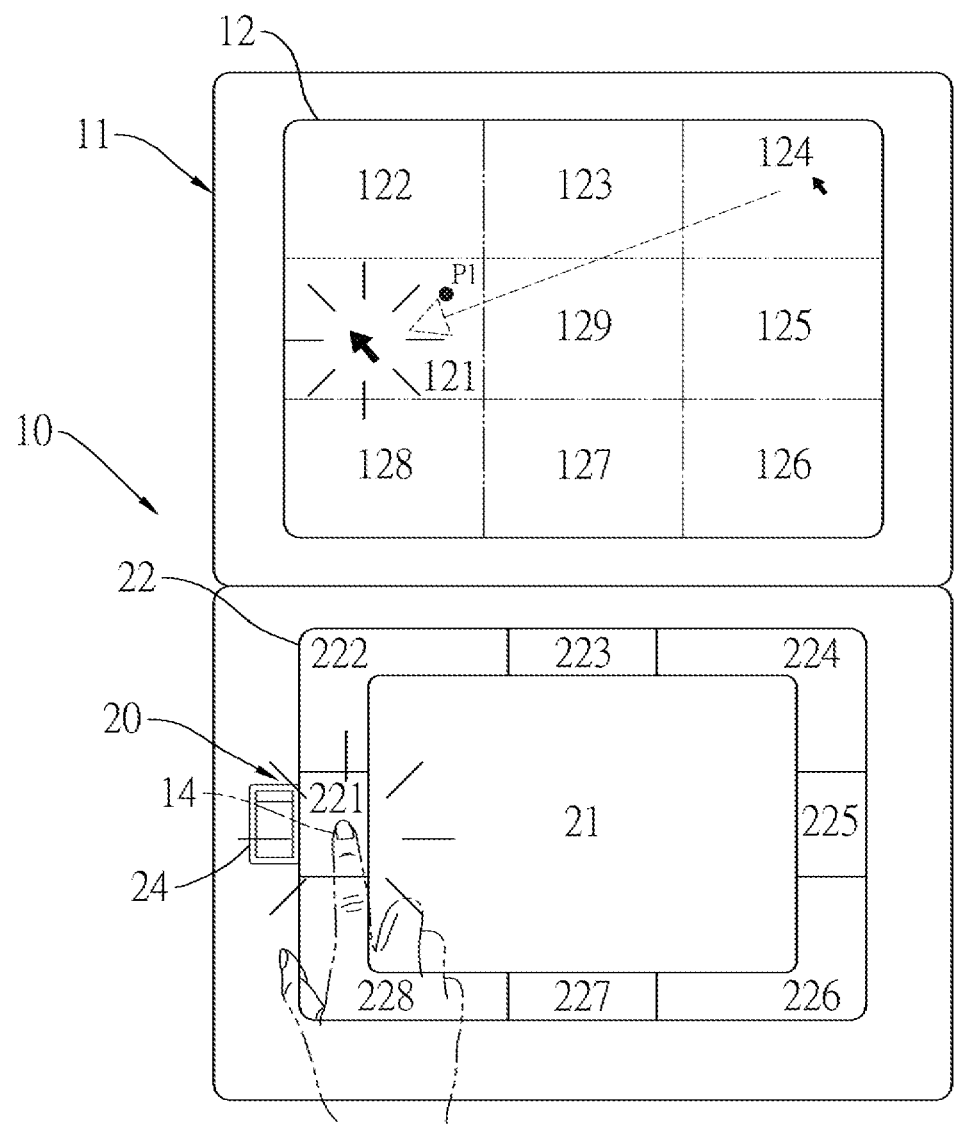
Figure 4C:
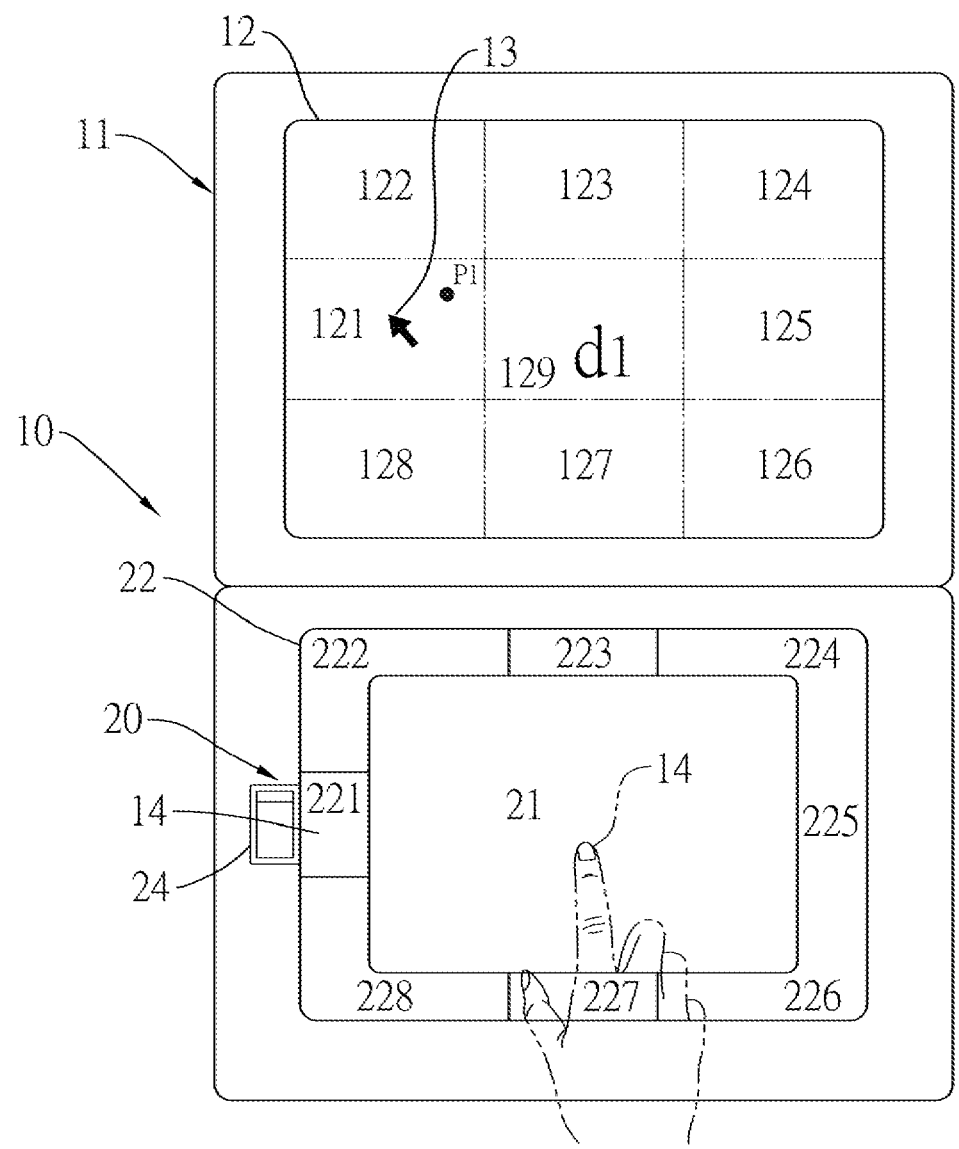

With reference to FIG. 4A, the screen cursor 13 is on the fourth display area 124 of the display screen 12, and a user wants to move the screen cursor 13 to a position P1 on the first display area 121. The user uses his finger (the object 14) double clicking (the control action) on the first sensing ring section 221 corresponding to the first display area 121 as shown in FIG. 4B, such that the screen cursor 13 is rapidly displayed on the first display area 121. Finally, the user slightly slides on the touch screen 21 in a direction of the screen cursor 13 toward the position P1 to move the screen cursor 13 to the position P1 as shown in FIG. 4C.

Therefore, by the shortcut ring 22 of the shortcut touch panel 20, the user can move the screen cursor 13 to any one of the first display area 121 to the eight display area 128 rapidly. Then, the user can move the screen cursor 13 to an expected position on the display screen 12 by a single slide on the touch screen 21 of the shortcut touch panel 20. In conclusion, moving the screen cursor 13 becomes faster and more convenient for the user by the shortcut touch panel 20.

When the shortcut touch panel 20 is operated in the second function mode, the first sensing ring section 221 to the eighth sensing ring section 228 of the shortcut ring 22 respectively correspond to a custom function of the electronic device 10. When the shortcut touch panel 20 senses a control action on any one of the sensing ring sections 221 to 228, the custom function corresponding to the sensing ring section 221 to 228 with the control action sensed thereon is launched. In this first preferred embodiment, each custom function can be set to any one of adjusting volume, adjusting monitor brightness, engaging sleeping mode of the electronic device 10, and turning off the electronic device 10 via the electronic device 10. Or, each custom function can be set to any one of a "Ctrl" key function, an "Alt" key function, a command key function, an "Enter" key function, and an "Esc" key function of a keyboard via the electronic device 10. The control action is double clicking or pressing on any sensing ring section 221 to 228 for at least one second.

Figure 5:
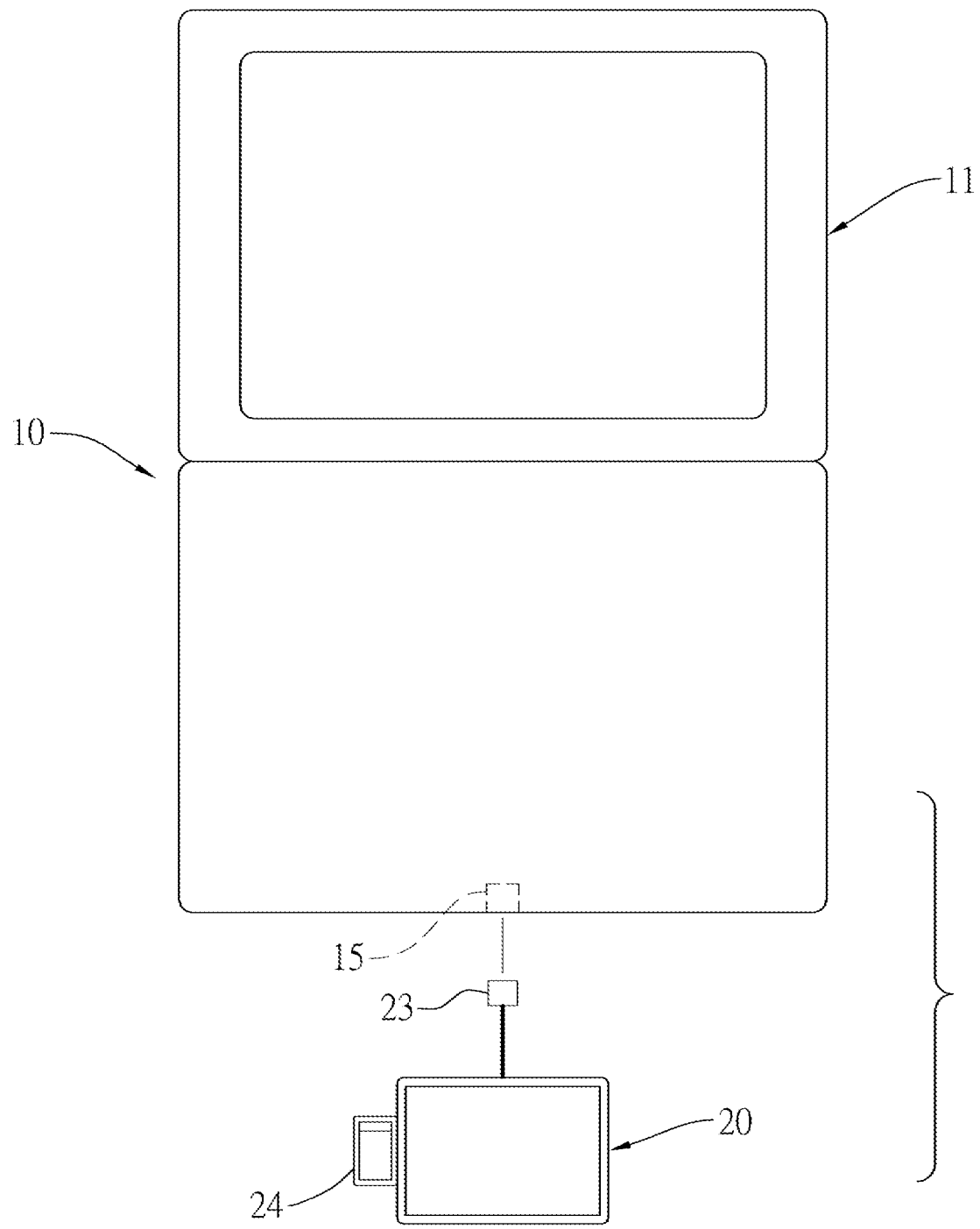
FIG. 5 is an exploded view of the operating system in FIG. 1.

Besides, with reference to FIG. 5, the electronic device 10 further comprises a USB port 15. The shortcut touch panel 20 further comprises a USB connector 23 electrically connected to the USB port 15 of the electronic device 10. Or, the shortcut touch panel 20 further comprises a wireless transmission module, wherein the shortcut touch panel 20 is wirelessly connected to the electronic device 10 via the wireless transmission module. In this first preferred embodiment, the wireless transmission module is a Bluetooth module.

Figure 6:
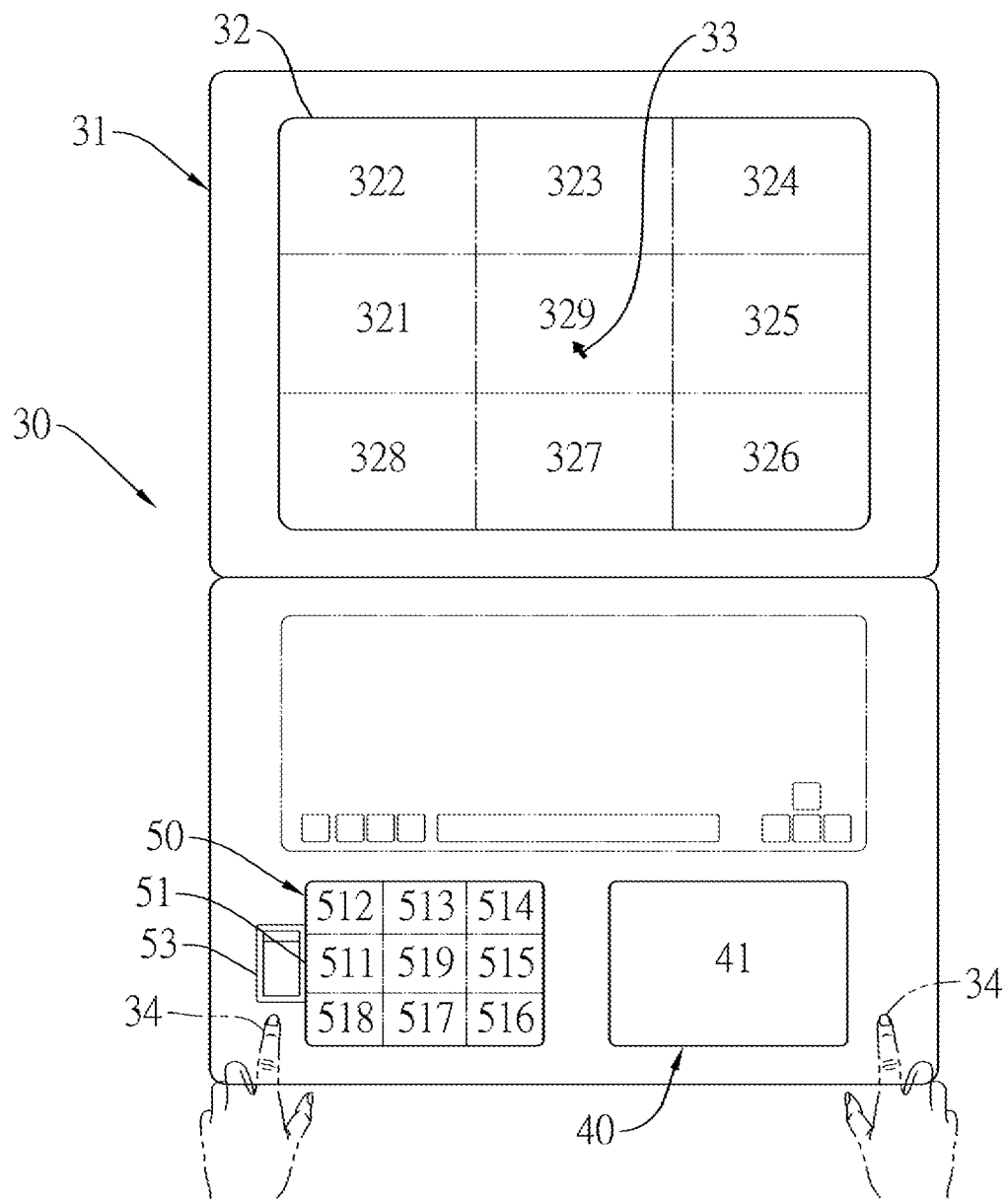
FIG. 6 is a top view of a second preferred embodiment of an operating system in accordance with the present invention.

With reference to FIG. 6, a second preferred embodiment of an operating system in accordance with the present invention comprises an electronic device 30, a touch panel 40 and a shortcut touch panel 50 electrically connected to the electronic device 30. In the second preferred embodiment, the electronic device 30 is a laptop.

The electronic device 30 has a monitor unit 31. The monitor unit 31 has a display screen 32, wherein the display screen 32 is square and is divided into a three-by-three grid having nine blocks, wherein the nine blocks are respectively a first display area 321 to a ninth display area 329 in sequence. A screen cursor 33 is displayed on the display screen 32.

The ninth display area 329 is located at a center of the display screen 32. The second display area 322, the fourth display area 324, the sixth display area 326, and the eighth display area 328 are respectively located at an upper left corner, an upper right corner, a lower right corner, and a lower left corner of the display screen 32.

The first display area 321 is located between the second display area 122 and the eighth display area 328. The third display area 323 is located between the second display area 32 and the fourth display area 324. The fifth display area 325 is located between the fourth display area 324 and the sixth display area 326. The seventh display area 327 is located between the sixth display area 326 and the eighth display area 328. The first display area 121, the third display area 323, the fifth display area 325 and the seventh display area 327 respectively adjacent four sides of the ninth display area 329. The first display area 321 to the eighth display area 328 are adjacent a periphery of the display screen 32.

Figure 7:
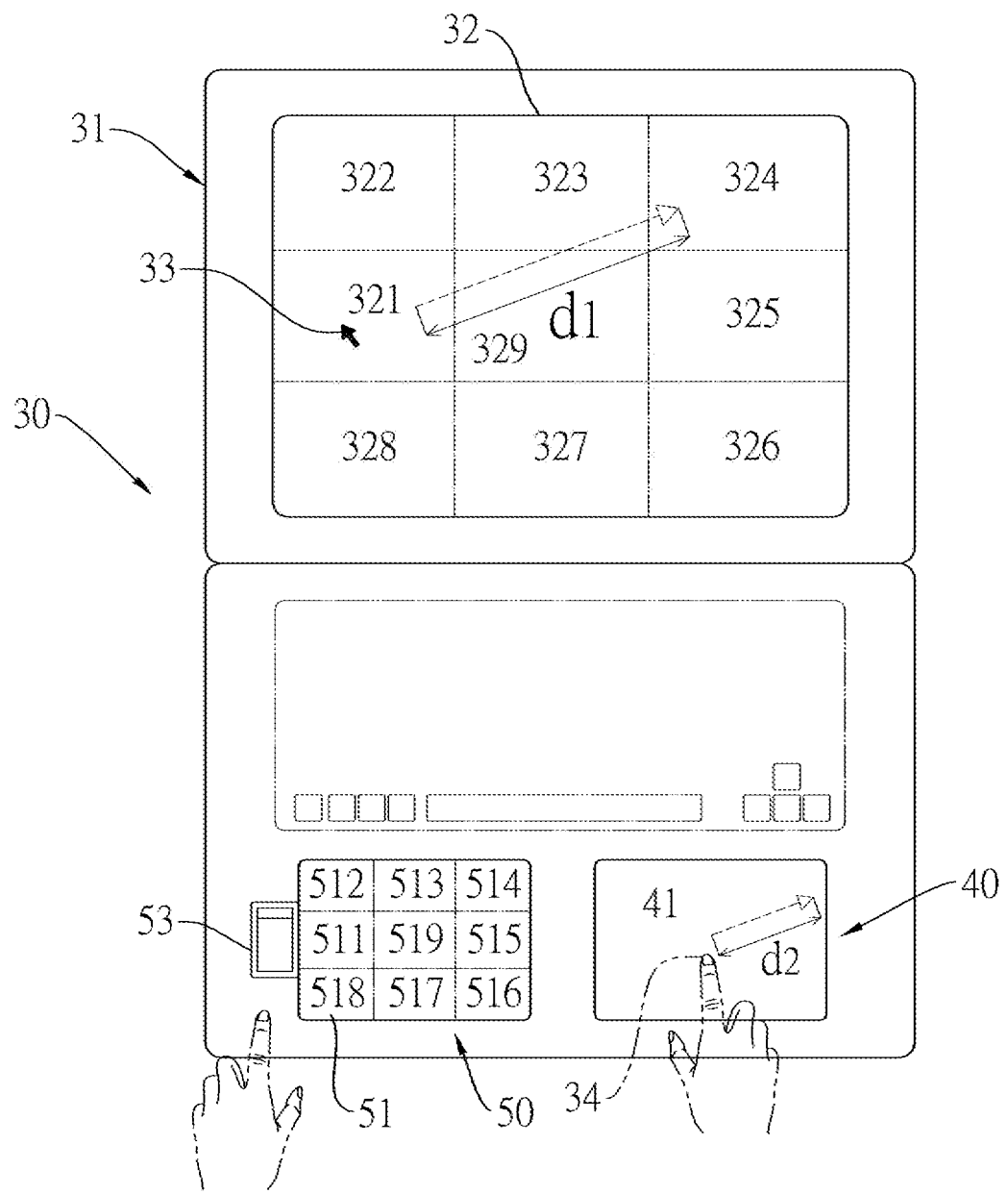
FIG. 7 shows a touch screen of a touch panel of the operating system in FIG. 6.

With reference to FIG. 7, the touch panel 40 is mounted on an operating area of the electronic device 30 and has a touch screen 41. When the touch panel 40 senses an object 34 moving on the touch screen 41, the screen cursor 33 moves along a moving direction of the object 34 on the touch screen 41, and a moving distance d2 of the screen cursor 33 is proportional to a moving distance d1 of the object 34. In the second preferred embodiment, the object 34 is a finger of a user or a stylus.

Figure 8A:
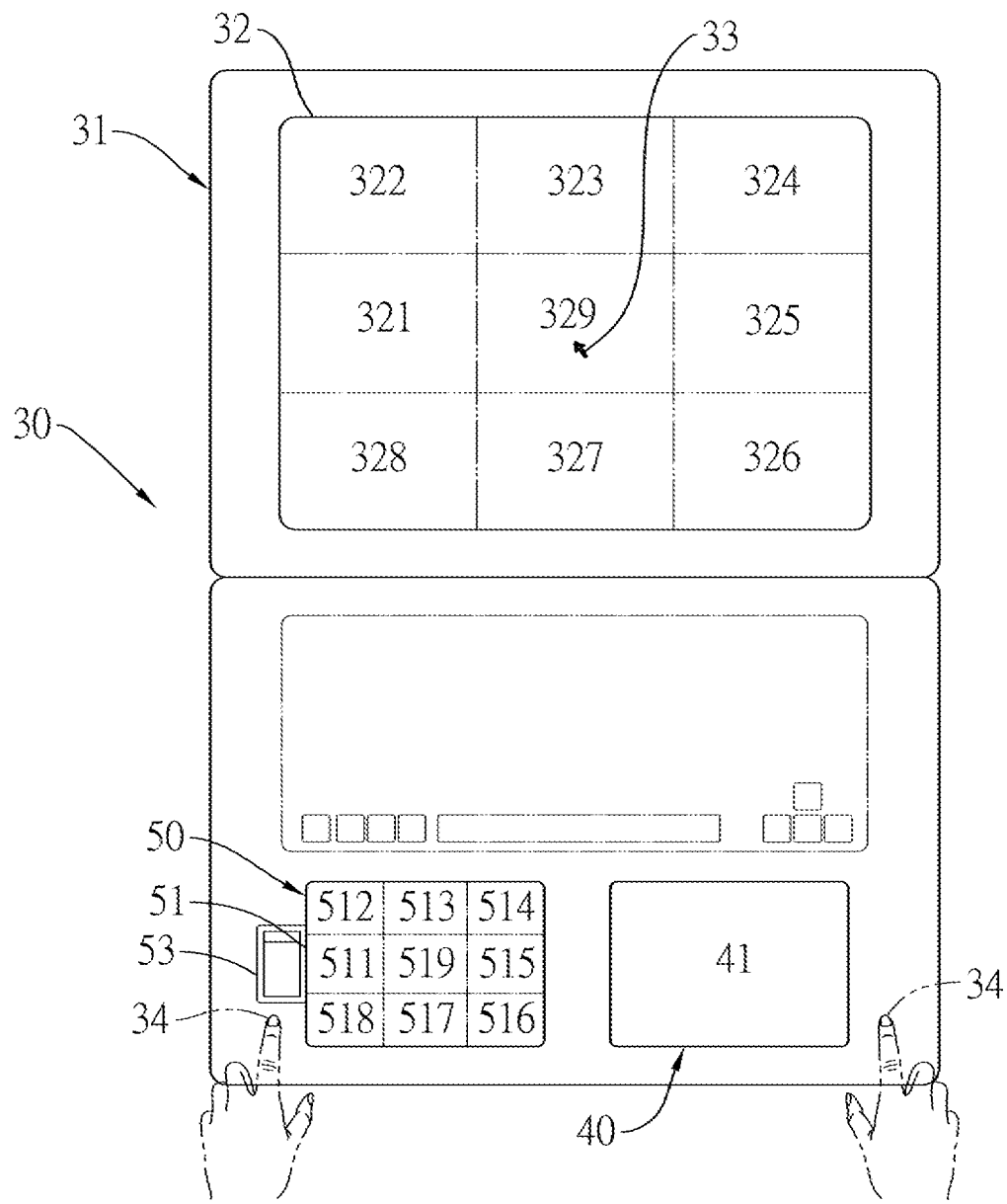
FIG. 8A to 8C show operating a shortcut screen of a shortcut touch panel of the operating system in FIG. 6.
Figure 8B:
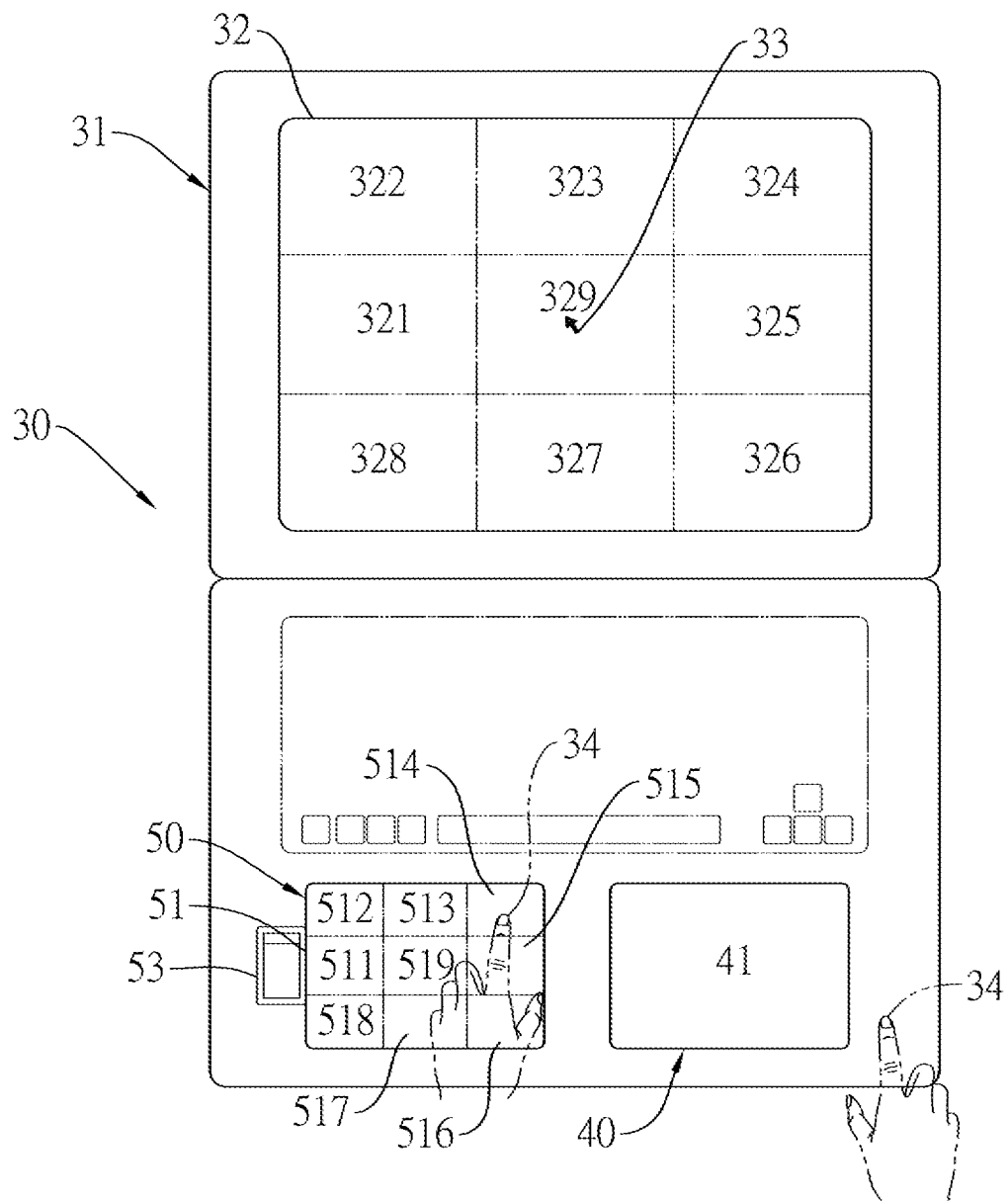
Figure 8C:
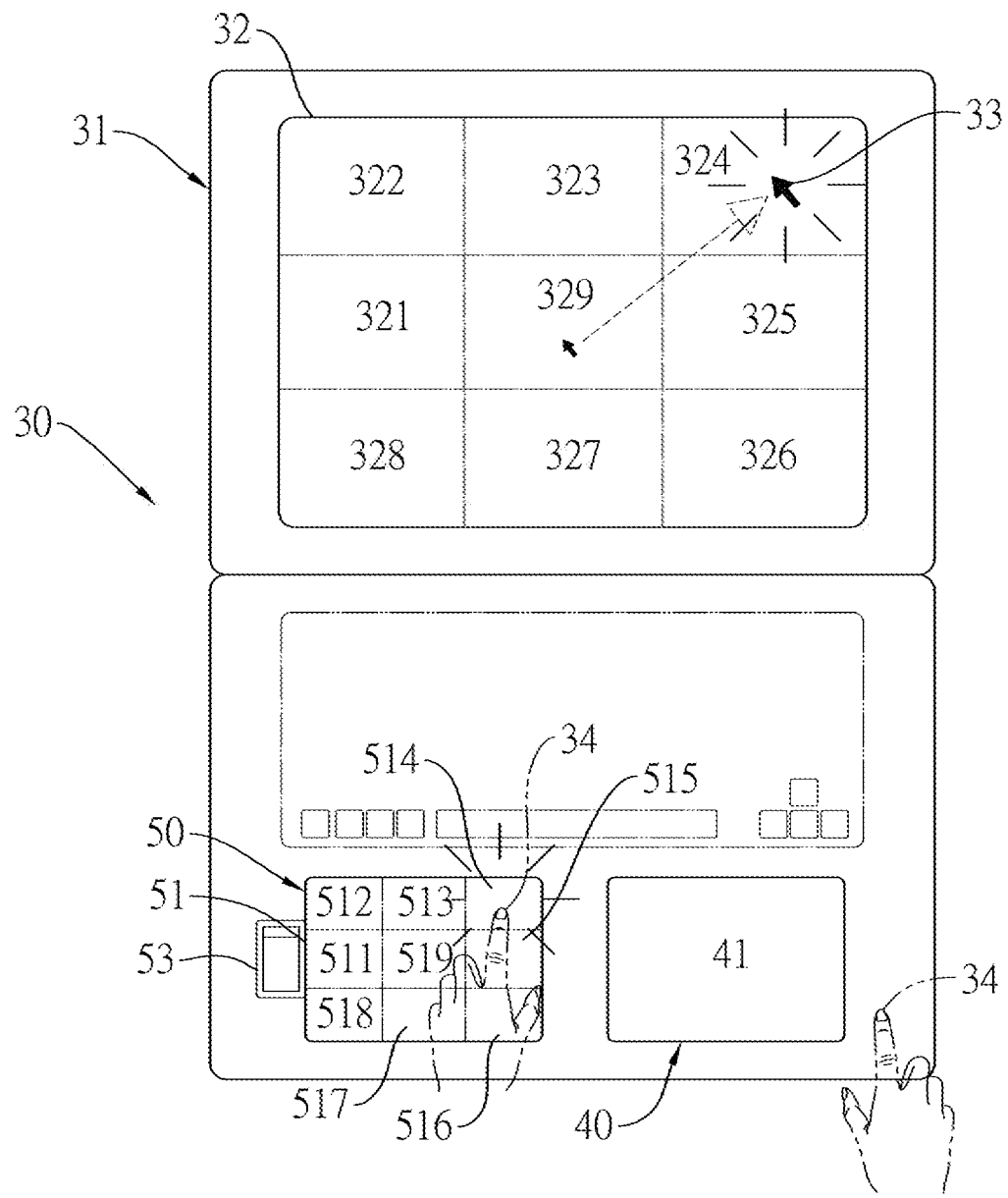

With reference to FIGS. 8A to 8C, the shortcut touch panel 50 is also mounted on the operating area of the electronic device 30, and has a shortcut screen 51 and a function switch 53, wherein the shortcut touch panel 50 has a first function mode and a second function mode. The function switch 53 is mounted on the shortcut touch panel 50 and is used to switch the function mode of the shortcut touch panel 50. In the second preferred embodiment, the function switch 53 is a button or a toggle switch.

The shortcut screen 51 is square and is divided into a three-by-three grid having nine blocks, wherein the nine blocks are respectively a first sensing section 511 to a ninth sensing section 519 in sequence. The first sensing section 511 to the ninth sensing section 519 sequentially correspond to the first display area 321 to the ninth display area 329 of the display screen 32 respectively.

The ninth sensing section 519 is located at a center of the shortcut screen 51. The second sensing section 512, the fourth sensing section 514, the sixth sensing section 516, and the eighth sensing section 518 are respectively located at an upper left corner, an upper right corner, a lower right corner, and a lower left corner of the shortcut screen 51.

The first sensing section 511 is located between the second sensing section 512 and the eighth sensing section 518. The third sensing section 513 is located between the second sensing section 512 and the fourth sensing section 514. The fifth sensing section 515 is located between the fourth sensing section 514 and the sixth sensing section 516. The seventh sensing section 517 is located between the sixth sensing section 516 and the eighth sensing section 518. The first sensing section 511, the third sensing section 513, the fifth sensing section 515, and the seventh sensing section 517 are respectively adjacent four sides of the ninth sensing section 519. The first sensing section 511 to the eighth sensing section 518 are adjacent a periphery of the shortcut screen 51.

Figure 9A:
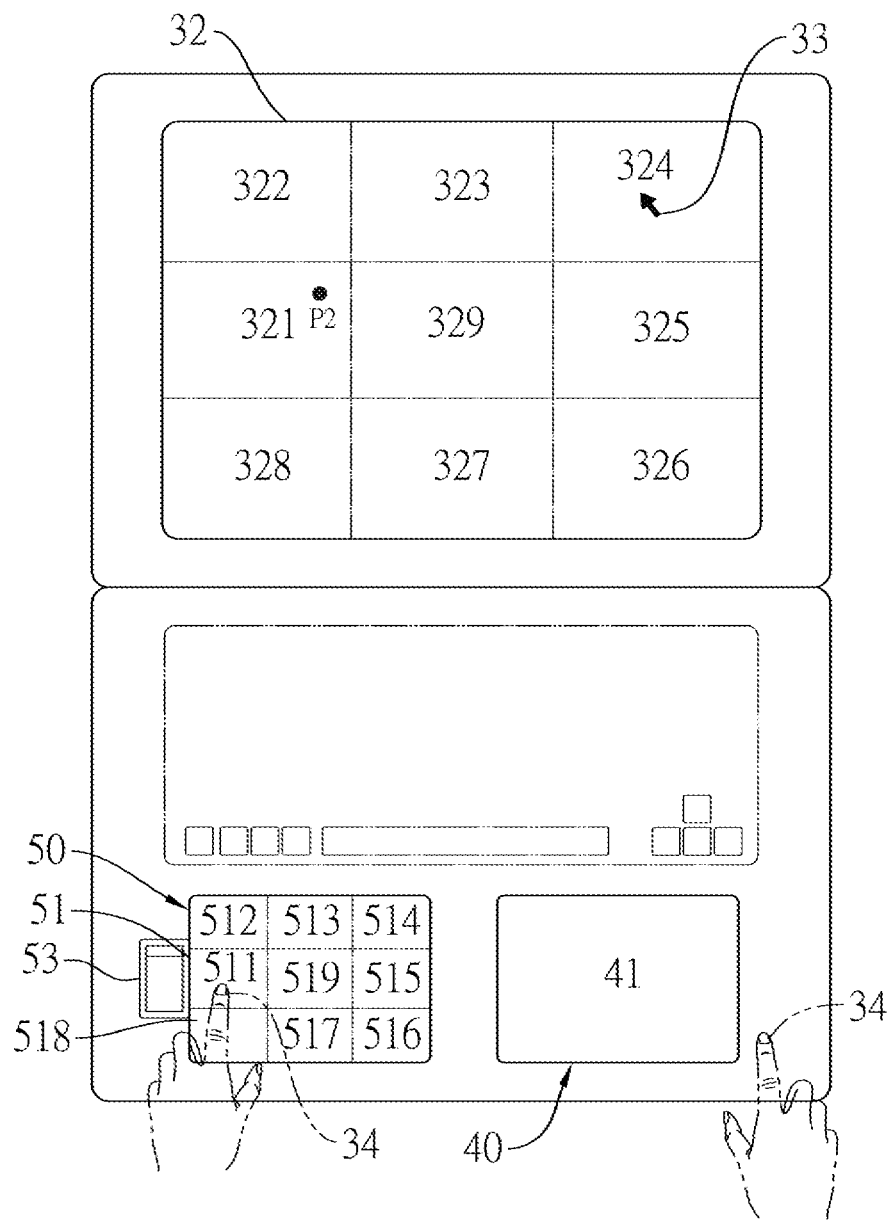
FIG. 9A to 9C show moving a screen cursor to an expected position on a display screen of the operating system in FIG. 6 by operating the touch panel and the shortcut touch panel.
Figure 9B:
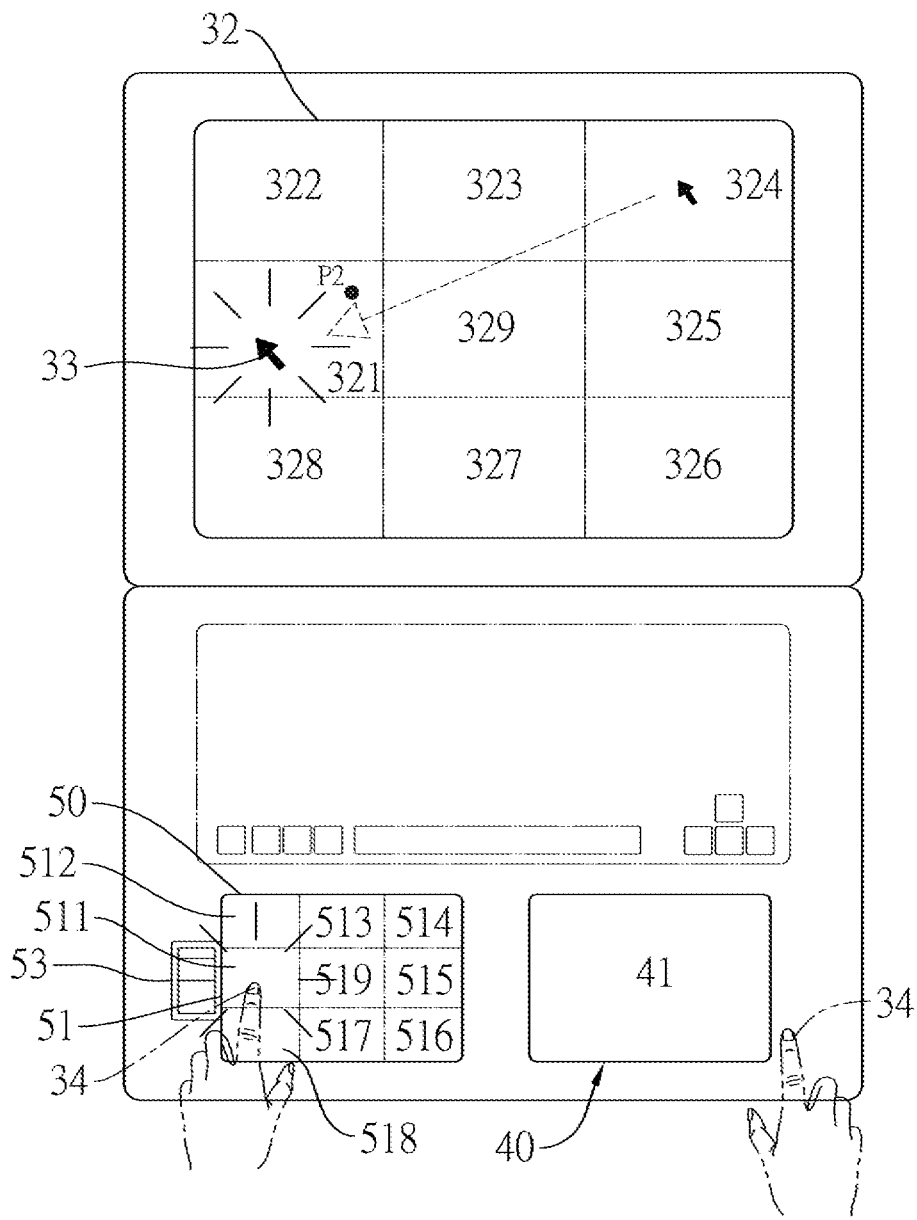
Figure 9C:
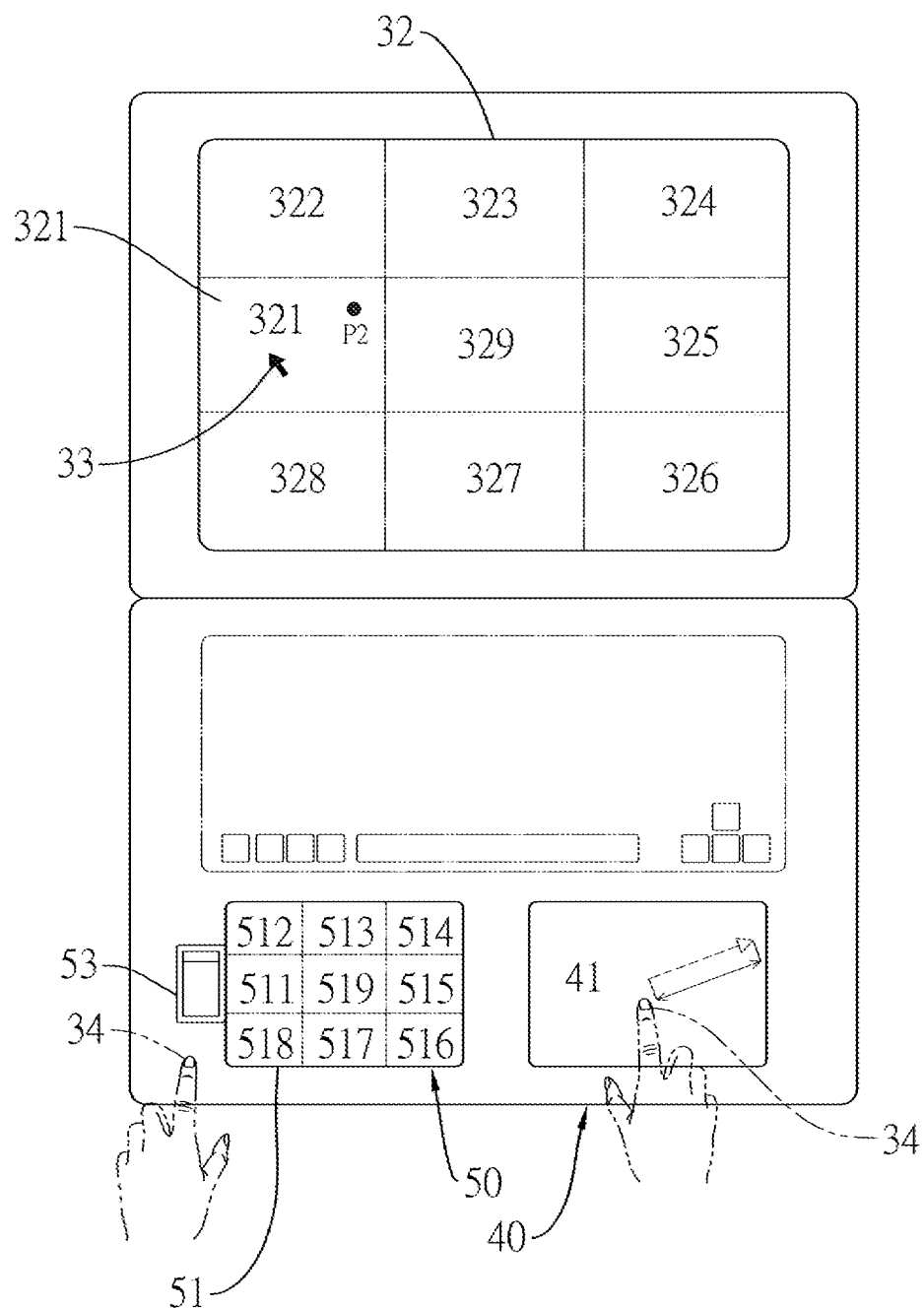

With reference to FIG. 9A, the screen cursor 33 is on the ninth display area 529 of the display screen 32, and a user wants to move the screen cursor 33 to a position P2 on the fourth display area 324. Then, the user uses his finger (the object 34) double clicking (the control action) the fourth sensing section 514 corresponding to the fourth display area 324 as shown in FIG. 9B, such that the screen cursor 33 is rapidly displayed on the fourth display area 324. Finally, the user slightly slides on the touch screen 41 in a direction of the screen cursor 33 toward the position P2 to move the screen cursor 33 to the position P2 as shown in FIG. 9C.

Therefore, by the shortcut screen 51 of the shortcut touch panel 50, the user can move the screen cursor 33 to any one of the first display area 321 to the ninth display area 329 rapidly. Then, the user can move the screen cursor 33 to an expected position on the display screen 32 by a single slide on the touch screen 41 of the touch panel 40. In conclusion, moving the screen cursor 33 becomes faster and more convenient for the user by the shortcut touch panel 50.

When the shortcut touch panel 50 is operated in the second function mode, the first sensing section 511 to the ninth sensing section 519 of the shortcut screen 51 respectively correspond to a custom function of the electronic device 30. When the shortcut touch panel 50 senses a control action on any sensing section 511 to 519, the custom function corresponding to the sensing section 511 to 519 that has the control action sensed thereon is launched. In the second preferred embodiment, each custom function can be set to any one of adjusting volume, adjusting monitor brightness, engaging sleeping mode of the electronic device, 30 and turning off the electronic device 30 via the electronic device 30. Or, each custom function can be set to any one of a "Ctrl" key function, an "Alt" key function, a "Command" key function, an "Enter" key function, and an "Esc" key function of a keyboard via the electronic device 30. The control action is double click or pressing for at least one second on any sensing section 511 to 519.

Figure 10:
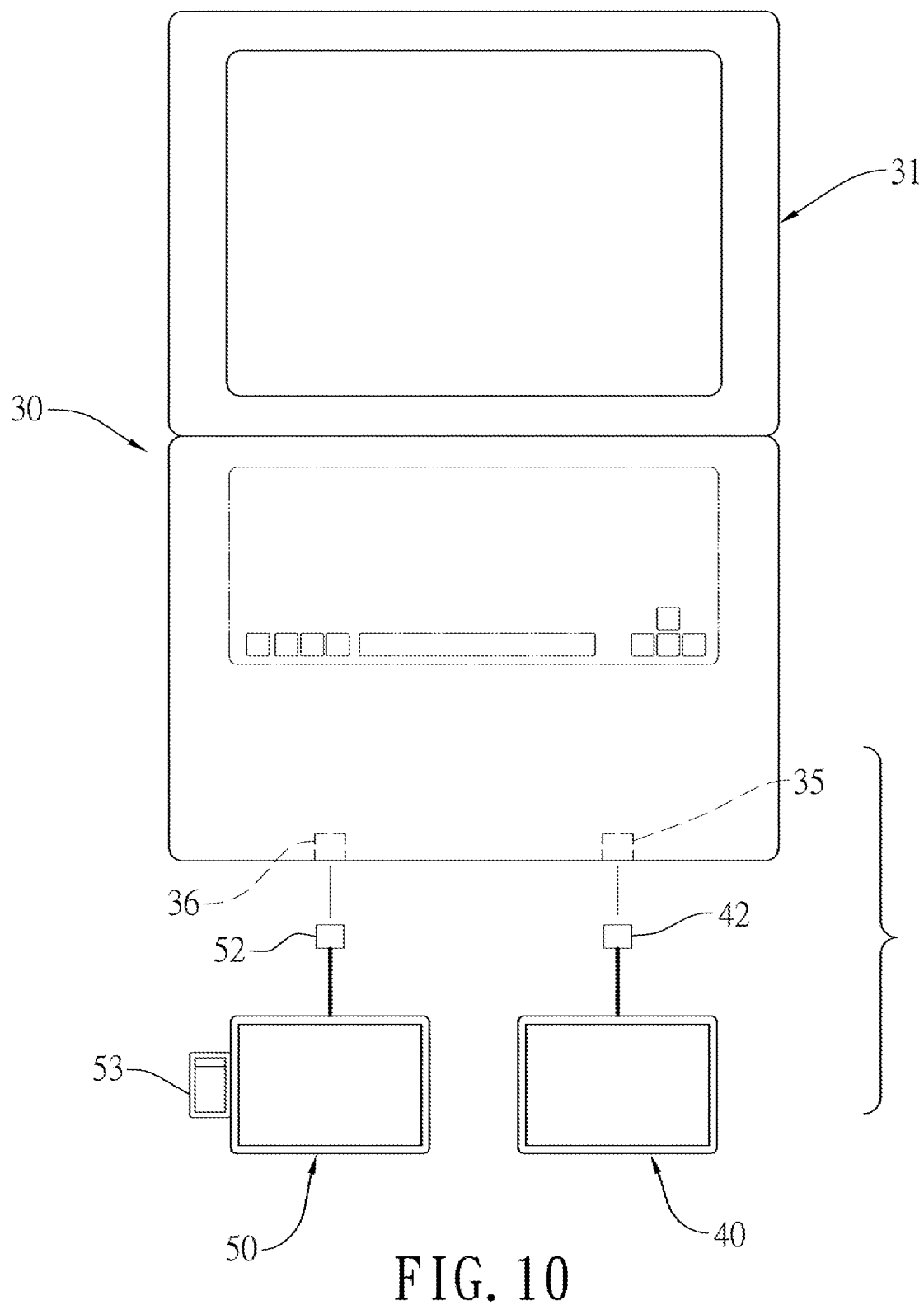
FIG. 10 is an exploded view of the operating system in FIG. 6.
Figure 11:
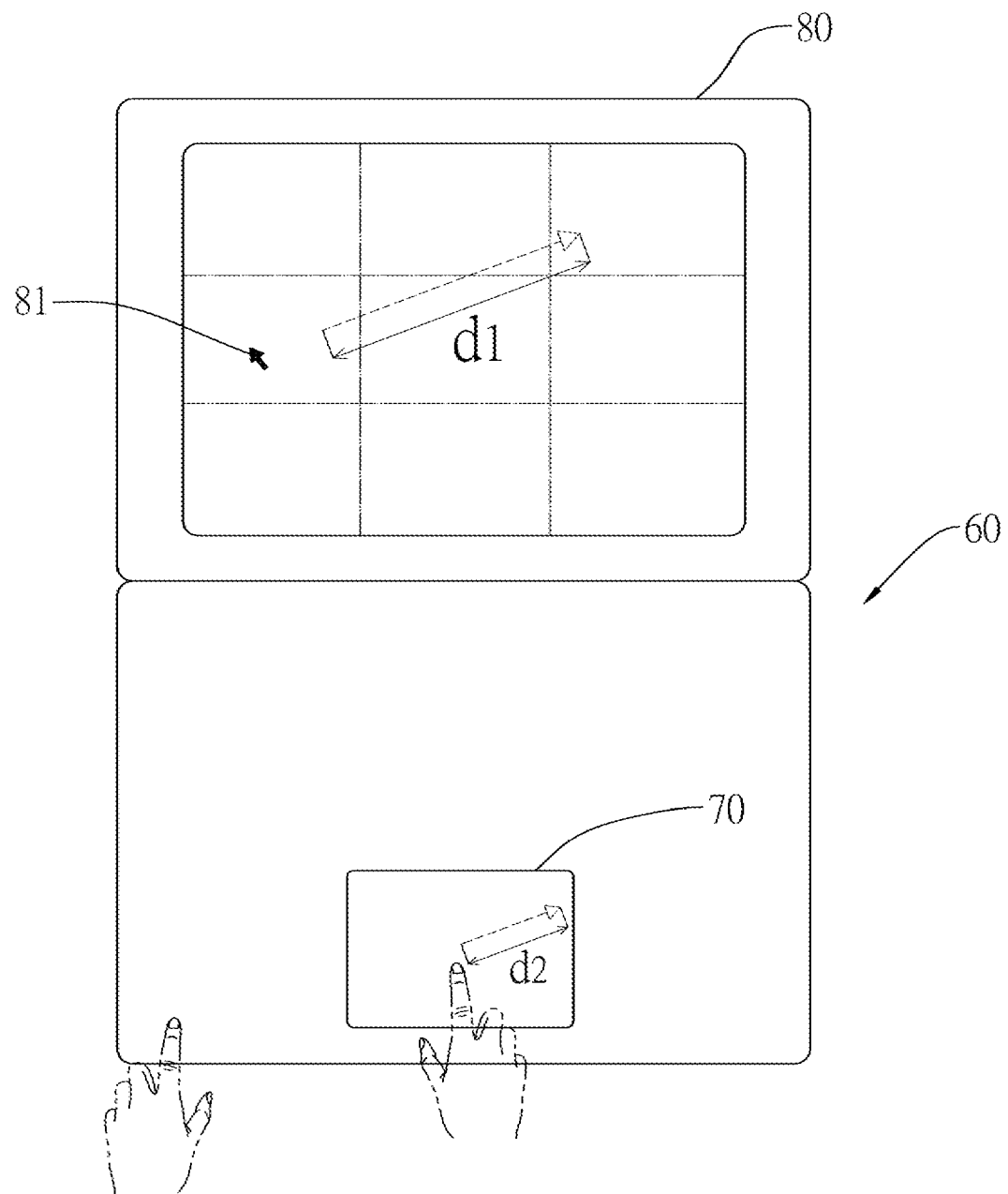
FIG. 11 shows operating a touch panel of a conventional operating system.

Further, with reference to FIG. 10, the electronic device further comprises two USB ports 35, 36, the touch panel 40 further comprises a USB connector 42 electrically connected to the USB port 35, and the shortcut touch panel 50 further comprises a USB connector 52 electrically connected to the USB port 36. Or, the touch panel 40 further comprises a first wireless transmission module, wherein the touch panel 40 is wirelessly connected to the electronic device 30 by the first wireless transmission module. The shortcut touch panel 50 further comprises a second wireless transmission module, wherein the shortcut touch panel 50 is wirelessly connected to the electronic device 30 by the second wireless transmission module.

By the first wireless transmission module and the second wireless transmission module, the touch panel 40 and the shortcut touch panel 50 are both wirelessly connected to the electronic device 30, thus, a user can change positions of the touch panel 40 and the shortcut touch panel 50 as desired regardless that the user is right-handed, left-handed or using two hands.

In conclusion, when the shortcut touch panel of the first or the second preferred embodiment is operated in the first function mode, the user can move the screen cursor faster and more conveniently. When the shortcut touch panel is operated in the second function mode, the user can launch custom functions of the electronic device rapidly by the shortcut touch panel.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An operating system having a shortcut touch panel having shortcut functions, the operating system comprising:
   an electronic device having
      a monitor unit having
         a display screen, wherein the display screen is divided into multiple display areas; and
         a screen cursor displayed on the display screen; and
      a shortcut touch panel electrically connected to the electronic device, and having a first function mode and a second function mode, wherein the shortcut touch panel has
         a touch screen, wherein when the shortcut touch panel senses an object moving on the touch screen, the screen cursor moves on the display screen along a moving direction of the object, and a moving distance of the screen cursor is proportional to a moving distance of the object;
         a shortcut ring surrounding the touch screen, wherein the shortcut ring has
            multiple sensing ring sections respectively corresponding to the multiple display areas of the monitor unit; and
         a function switch mounted on a side of the shortcut touch panel and used to select the first function mode or the second function mode of the shortcut touch panel;
   wherein when the shortcut touch panel is operated in the first function mode, the multiple sensing ring sections respectively correspond to the multiple display areas of the display screen of the monitor unit, and when the shortcut touch panel senses a control action on any sensing ring section, the screen cursor is displayed on one of the display areas corresponding to the sensing ring section that has the control action sensed thereon; and
   wherein when the shortcut touch panel is operated in the second function mode, the multiple sensing ring sections of the shortcut touch panel each have a respective custom function corresponding to the electronic device, and when the shortcut touch panel senses a control action on any sensing ring section, the custom function corresponding to the sensing ring section that has the control action sensed thereon is launched.

2. The operating system as claimed in claim 1, wherein each custom function is any one of adjusting volume, adjusting monitor brightness, engaging a sleeping mode of the electronic device, and turning off the electronic device.

3. The operating system as claimed in claim 1, wherein each custom function is any one of a Ctrl key function, an Alt key function, a Command key function, an Enter key function, and an Esc key function.

4. The operating system as claimed in claim 1, wherein the display screen is square and is divided into nine display areas, wherein the nine display areas are square and form a three-by-three grid; and
   the shortcut ring of the shortcut touch panel has eight sensing ring sections respectively corresponding to eight of the nine display areas when the shortcut touch panel is operated in the first function mode.

5. The operating system as claimed in claim 4, wherein the control action is a double click on any sensing ring section.

6. The operating system as claimed in claim 4, wherein the control action is pressing for at least one second on any sensing ring section.

7. The operating system as claimed in claim 1, wherein the control action is pressing for at least one second on any sensing ring section.

8. The operating system as claimed in claim 1, wherein the control action is a double click on any sensing ring section.

9. The operating system as claimed in claim 1, wherein the shortcut touch panel is mounted on the electronic device.

10. The operating system as claimed in claim 1, wherein the electronic device further comprises a USB port; and
    the shortcut touch panel further comprises a USB connector electrically connected to the USB port of the electronic device.

11. The operating system as claimed in claim 1, wherein the shortcut touch panel further comprises a wireless transmission module, and the shortcut touch panel is wirelessly connected to the electronic device via the wireless transmission module.

12. An operating system having a shortcut touch panel having shortcut functions, the operating system comprising:
    an electronic device having
        a monitor unit having
            a display screen, wherein the display screen is divided into multiple display areas; and
            a screen cursor displayed on the display screen;
        a touch panel electrically connected to the electronic device and having
            a touch screen, wherein when the touch panel senses an object moving on the touch screen, the screen cursor moves on the display screen along a moving direction of the object, and a moving distance of the screen cursor is proportional to a moving distance of the object; and
        a shortcut touch panel electrically connected to the electronic device and having
            a shortcut screen, wherein the shortcut screen is divided into multiple sensing sections; and
            a function switch mounted on a side of the shortcut touch panel and used to switch a function mode of the shortcut touch panel;
    wherein when the shortcut touch panel is operated in a first function mode, the multiple sensing sections respectively correspond to the multiple display areas of the display screen of the monitor unit, and when the shortcut touch panel senses a control action on any sensing section, the screen cursor is displayed on one of the display areas corresponding to the sensing section that has the control action sensed thereon; and
    wherein when the shortcut touch panel is operated in a second function mode, the multiple sensing sections each have a respective custom function corresponding to the electronic device, and when the shortcut touch panel senses a control action on any sensing section, the custom function corresponding to the sensing section that has the control action sensed thereon is launched.

13. The operating system as claimed in claim 12, wherein each custom function is any one of adjusting volume, adjusting monitor brightness, engaging a sleeping mode of the electronic device, and turning off the electronic device.

14. The operating system as claimed in claim 12, wherein each custom function is any one of a Ctrl key function, an Alt key function, a Command key function, an Enter key function, and an Esc key function.

15. The operating system as claimed in claim 12, wherein the display screen is square and is divided into nine display areas, wherein the nine display areas are square and form a three-by-three grid; and
    the shortcut screen of the shortcut touch panel is square and is divided into nine square sensing sections, wherein the nine sensing sections form a three-by-three grid and respectively correspond to the nine display areas when the shortcut touch panel is operated in the first function mode.

16. The operating system as claimed in claim 15, wherein the control action is a double click on any sensing ring section.

17. The operating system as claimed in claim 15, wherein the control action is pressing for at least one second on any sensing ring section.

18. The operating system as claimed in claim 12, wherein the control action is pressing for at least one second on any sensing ring section.

19. The operating system as claimed in claim 12, wherein the control action is a double click on any sensing ring section.

20. The operating system as claimed in claim 12, wherein the touch panel and the shortcut touch panel are mounted on the electronic device.

21. The operating system as claimed in claim 12, wherein the electronic device further comprises a USB port; and
    the shortcut touch panel further comprises a USB connector electrically connected to the USB port of the electronic device.

22. The operating system as claimed in claim 12, wherein the shortcut touch panel further comprises a wireless transmission module, and the shortcut touch panel is wirelessly connected to the electronic device via the wireless transmission module.

* * * * *